US011046331B2

United States Patent
Nagase et al.

(10) Patent No.: US 11,046,331 B2
(45) Date of Patent: Jun. 29, 2021

(54) DRIVING ASSIST SYSTEM

(71) Applicant: SUBARU CORPORATION, Tokyo (JP)

(72) Inventors: Takayuki Nagase, Tokyo (JP); Eiichi Shiraishi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 289 days.

(21) Appl. No.: 16/241,751

(22) Filed: Jan. 7, 2019

(65) Prior Publication Data
US 2019/0300014 A1 Oct. 3, 2019

(30) Foreign Application Priority Data

Mar. 29, 2018 (JP) .............................. JP2018-063564

(51) Int. Cl.
B60W 50/08 (2020.01)
B62D 1/04 (2006.01)
(Continued)

(52) U.S. Cl.
CPC ........... B60W 50/082 (2013.01); B60K 35/00 (2013.01); B60W 50/10 (2013.01); B62D 1/046 (2013.01);
(Continued)

(58) Field of Classification Search
CPC .............. B60W 50/082; B60W 50/10; B60W 2540/18; B60W 2050/0073; B62D 1/046;
(Continued)

(56) References Cited

U.S. PATENT DOCUMENTS

2003/0189493 A1 10/2003 Klausner et al.
2005/0043867 A1 2/2005 Kudo
(Continued)

FOREIGN PATENT DOCUMENTS

JP 11-091397 A 4/1999
JP 4435519 B2 3/2010
(Continued)

OTHER PUBLICATIONS

Japanese Notification of Reasons for Refusal issued in corresponding Japanese Patent Application No. 2018-063564, dated Sep. 17, 2019, with English translation.

*Primary Examiner* — Rodney A Butler
(74) *Attorney, Agent, or Firm* — McDermott Will & Emery LLP

(57) ABSTRACT

A driving assist system includes a steering wheel contact position detector, a steering torque detector, and a driving mode setting calculator. The steering wheel contact position detector includes a plurality of contact sensors disposed in a segmented state on a circumference of a holding part provided on a steering wheel, and is configured to detect a position on the steering wheel at which a driver makes a contact with the steering wheel. The driving mode setting calculator is configured to set a driving mode on the basis of a driving condition. The driving mode setting calculator is configured to determine whether a steering torque detected by the steering torque detector is a steering override intended by the driver or is a false detection, on the basis of the steering torque detected by the steering torque detector and a position at which the contact is detected by the contact sensors.

13 Claims, 9 Drawing Sheets

(51) Int. Cl.
*B60W 50/10* (2012.01)
*B60K 35/00* (2006.01)
*B60W 50/00* (2006.01)

(52) U.S. Cl.
CPC .......................... *B60K 2370/1446* (2019.05); *B60K 2370/782* (2019.05); *B60W 2050/0073* (2013.01); *B60W 2540/18* (2013.01)

(58) Field of Classification Search
CPC . B62D 1/06; B62D 6/00; B60K 35/00; B60K 2370/782; B60K 2370/1446; B60K 2370/199; B60K 2370/175; B60K 37/06
See application file for complete search history.

(56) References Cited

U.S. PATENT DOCUMENTS

| | | |
|---|---|---|
| 2014/0156107 A1 | 6/2014 | Karasawa et al. |
| 2015/0283998 A1* | 10/2015 | Lind ..................... B60W 30/17 701/23 |
| 2016/0039428 A1 | 2/2016 | Odate |
| 2016/0062531 A1 | 3/2016 | Karasawa et al. |
| 2017/0151950 A1* | 6/2017 | Lien .................. B60W 50/0098 |
| 2017/0291544 A1* | 10/2017 | Ishihara ................. B60K 37/06 |
| 2018/0107214 A1* | 4/2018 | Chandy ................ B62D 5/0424 |
| 2020/0298881 A1* | 9/2020 | Odate ............... B60W 60/0015 |

FOREIGN PATENT DOCUMENTS

| | | |
|---|---|---|
| JP | 5009473 B2 | 8/2012 |
| JP | 2013-075652 A | 4/2013 |
| JP | 2016-038846 A | 3/2016 |
| JP | 2017-128180 A | 7/2017 |

* cited by examiner

DRIVING ASSIST SYSTEM

CROSS-REFERENCE TO RELATED APPLICATIONS

The present application claims priority from Japanese Patent Application No. 2018-063564 filed on Mar. 29, 2018, the entire contents of which are hereby incorporated by reference.

BACKGROUND

The technology relates to a driving assist system that assists a driver in driving a vehicle.

Various proposals have been made on driving assist systems with automatic driving that are to reduce a burden imposed on a driver and allow for comfortable driving. Some of such proposals have already been put into practical use in recent vehicles.

Driving modes of such a driving assist system include a driving assist mode in which a driver is made to stand by so that the driver is able to take over a driving operation when a control system of a vehicle determines that continuation of automatic driving is difficult, and another driving assist mode in which the driver is not required to take over the driving operation even when the control system of the vehicle determines that the continuation of the automatic driving is difficult. Hereinafter, the former and the latter are referred to as a "first driving assist mode" and a "second driving assist mode," respectively.

The first driving assist mode causes an own vehicle to travel along a lane line following a vehicle in front of the own vehicle through known active lane keep (ALK) control and an adaptive cruise control (ACC) system. In a case where no vehicle is detected in front of the own vehicle, the own vehicle travels at a preset constant vehicle speed. Accordingly, the first driving assist mode is based on a condition that, although the driver does not need to actively operate a steering wheel, the driver is in a state of being ready to take over the driving at any time by holding the steering wheel with both hands.

In the second driving assist mode, on the other hand, a degree of coincidence between a shape of a road on a map on which the own vehicle is traveling as detected by a map locator and a road shape of a lane line along which the own vehicle is actually traveling as detected by, for example, a camera unit is monitored on a constant basis. In a case where this degree of coincidence is high, the automatic driving is continued with a control system playing a major role without requiring the driver to hold the steering wheel with both hands. Only in a case where it is determined that the continuation of the automatic driving is difficult, the driver is requested to hold the steering wheel with both hands to make a transition into the first driving assist mode, or an automatic refuge mode is executed. In the automatic refuge mode, the own vehicle is made to travel in its driving lane at a legally permitted or designated lowest speed. Alternatively, the own vehicle is guided to a safe location, such as a side strip or a pedestrian walkway, and is stopped.

In a case where the driver takes hold of the steering wheel while the own vehicle is traveling in the second driving assist mode, the driving assist system determines this to be the driver's intention and causes the driving mode to make a transition to the first driving assist mode. In addition, in a case where the driving assist system has detected a steering intervention by the driver (i.e., a steering override), the automatic driving is suspended, and the driving mode is caused to make a transition to a manual driving mode. In a case where this transition is an erroneous operation, however, this operation is against the intention of the driver who is to continue with the automatic driving and may cause a sense of discomfort in the driver.

Japanese Patent (JP-B) No. 5009473 discloses a technique for determining whether a driver is holding a steering wheel, for example. According to this technique, a touch sensor, such as a pressure sensor, a capacitance sensor, or an electrode pair, is provided on a rim of a steering wheel to determine whether a driver is holding the steering wheel and the position on the steering wheel at which the driver holds the steering wheel.

In addition, JP-B No. 4435519 discloses a technique for detecting a steering intervention by a driver. According to this technique, a steering torque detected by a torque sensor is compared against a threshold set on the basis of a vehicle speed. In a case where the steering torque is equal to or greater than the threshold, the steering torque is determined to be a steering intervention by the driver, and the automatic steering is cancelled.

SUMMARY

An aspect of the technology provides a driving assist system that includes: a steering wheel contact position detector including a plurality of contact sensors, in which the contact sensors are disposed in a segmented state on a circumference of a holding part provided on a steering wheel, and the steering wheel contact position detector is configured to detect a position on the steering wheel at which a driver makes a contact with the steering wheel; a steering torque detector configured to detect a steering torque of the driver; and a driving mode setting calculator configured to set a driving mode of an own vehicle on a basis of a driving condition. The driving mode includes a first driving assist mode, a second driving assist mode, and a manual driving mode. The first driving assist mode allows for automatic driving that is based on a condition that the driver holds the steering wheel, the second driving assist mode allows for the automatic driving that is not based on the condition that the driver holds the steering wheel, and the manual driving mode allows the driver himself/herself to steer the steering wheel. The driving mode setting calculator is configured to determine whether the steering torque detected by the steering torque detector is a steering override intended by the driver or is a false detection that is not the steering override, on a basis of the steering torque detected by the steering torque detector and a position at which the contact is detected by the contact sensors.

An aspect of the technology provides a driving assist system that includes: a contact position detector including a plurality of contact sensors, in which the contact sensors are disposed in a segmented state on a circumference of a holding part provided on a steering wheel, and the contact position detector is configured to detect a position on the steering wheel at which a driver makes a contact with the steering wheel; a torque detector configured to detect a steering torque of the driver; and circuitry configured to set a driving mode of an own vehicle on a basis of a driving condition, in which the driving mode includes a first driving assist mode, a second driving assist mode, and a manual driving mode, the first driving assist mode allows for automatic driving that is based on a condition that the driver holds the steering wheel, the second driving assist mode allows for the automatic driving that is not based on the condition that the driver holds the steering wheel, and the manual driving mode allows the driver himself/herself to steer the steering wheel, and determine whether the steering torque detected by the torque detector is a steering override intended by the driver or a false detection, on a basis of the steering torque detected by the torque detector and a position at which the contact is detected by the plurality of contact sensors.

DETAILED DESCRIPTION

Figure 1:
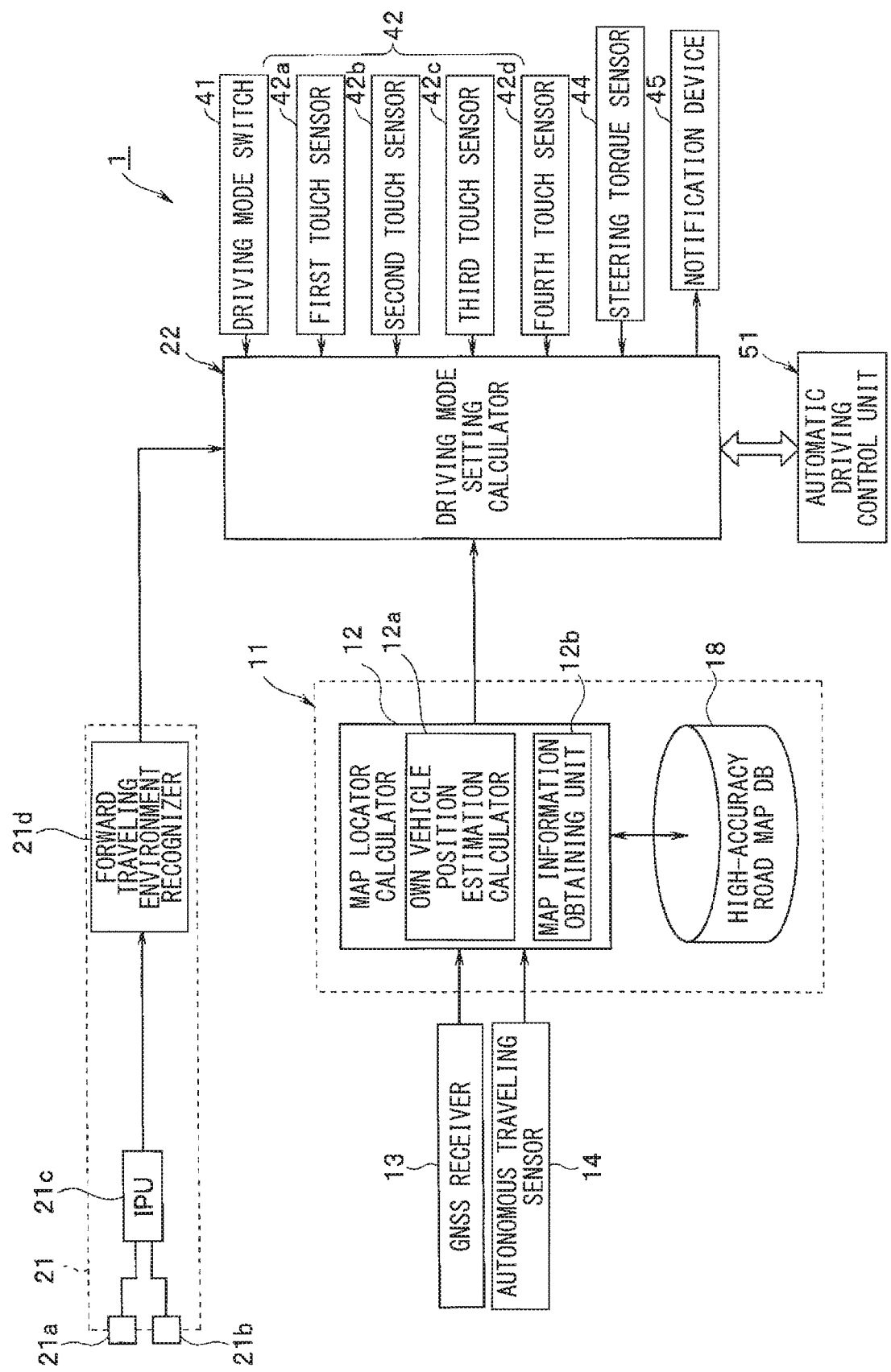
FIG. 1 schematically illustrates an example of a configuration of a driving assist system according to one implementation of the technology.

Hereinafter, some implementations of the technology will be described with reference to the drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

According to the technique disclosed in JP-B No. 4435519, the user's intention on the steering intervention (i.e., the steering override) is detected by detecting the steering torque with the torque sensor.

However, in traveling in the second driving assist mode, the driver is not required to hold the steering wheel with both hands. Thus, the driver is likely to take such action as changing his/her posture by, for example, turning rearward during traveling. At this point, in a conceivable case, a hand or a portion of the body of the driver may accidentally make contact with the steering wheel to produce a steering torque in an unintended direction. Determining the thus-produced steering torque as a steering intervention goes against the driver's intention, and in a case where the driver is given a notification stating "a transition will be made to the manual driving mode," for example, the driver may experience a sense of discomfort.

Even in a case where the own vehicle is traveling in the first driving assist mode, which is based on the condition that the driver holds the steering wheel with both hands, in a case where the torque sensor detects a steering torque that is traceable to external disturbance, such as an uneven road surface or a side wind, this steering torque may possibly be determined erroneously to be a steering intervention by the driver (i.e., a steering override).

It is desirable to provide a driving assist system that makes it possible to reduce any sense of discomfort to be experienced by a driver.

Figure 9A:
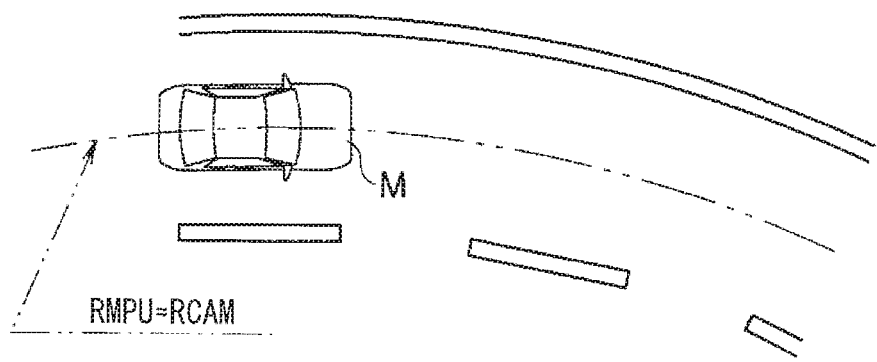
FIG. 9A illustrates a state in which a road curvature on a map and a road curvature recognized by a camera unit coincide with each other.
Figure 9B:
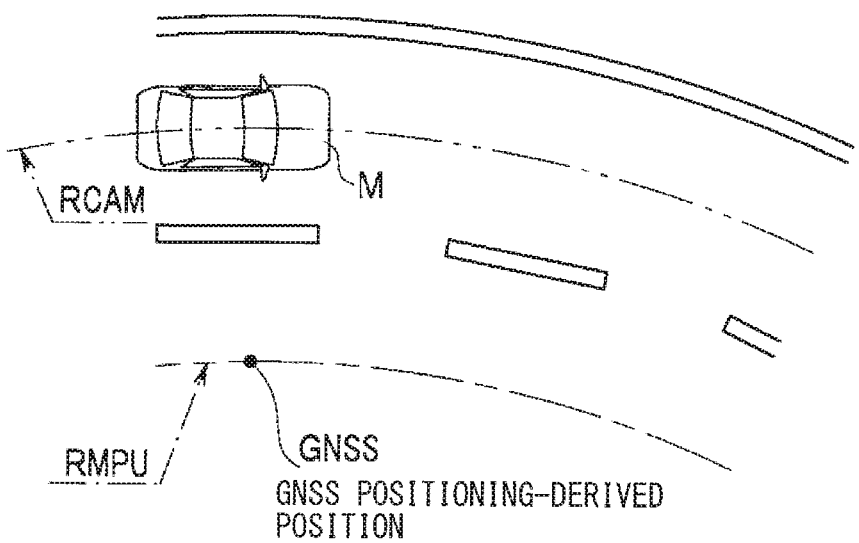
FIG. 9B illustrates a state in which the road curvature on the map and the road curvature recognized by the camera unit differ from each other.

Referring to FIG. 1, a driving assist system may be mounted on an own vehicle M, as illustrated in FIGS. 9A and 9B. The driving assist system 1 may include a sensor unit that detects a shape of a road around the own vehicle M. The sensor unit may include a locator unit 11 and a camera unit 21. In one implementation, the camera unit 21 may serve as a "traveling environment recognizer." The locator unit 11 and the camera unit 21 may constitute a completely independent multiplex system in which the locator unit 11 and the camera unit 21 do not depend on each other. Furthermore, a redundant system may be constructed that, in a case where one of the locator unit 11 and the camera unit 21 malfunctions, causes the automatic driving to be temporarily continued with the other one of the locator unit 11 and the camera unit 21 and allows the driver to safely take over the driving of the own vehicle M.

This driving assist system 1 may monitor whether the shape of the road on which the own vehicle M is currently traveling as detected by the locator unit 11 is identical to the shape of the same road as detected by the camera unit 21 and allow the automatic driving to continue in a case where the shapes of the road are identical. In the example implementation, a road curvature may be detected to determine the identicalness of the shapes of the road by the locator unit 11 and the camera unit 21.

The locator unit 11 may estimate a position of the own vehicle M (i.e., an own vehicle position) on a road map and acquire map data of the road ahead of the own vehicle position. The camera unit 21 may recognize lane lines that define right and left of a lane in which the own vehicle M is traveling. The camera unit 21 may also determine a road curvature in the middle of the recognized lane lines and detect a lateral position deviation. The lateral position deviation may be a deviation of the own vehicle M in a vehicle-width direction and based on the middle of the recognized lane lines serving as a reference.

The locator unit 11 may include a map locator calculator 12 and a high-accuracy road map database 18. In one implementation, the high-accuracy road map database 18 may serve as a "storage." The map locator calculator 12, a forward traveling environment recognizer 21d, a driving mode setting calculator 22, and an automatic driving control unit 51 may each be constituted by a known microcomputer and its peripherals. The microcomputer may include such devices as a central processing unit (CPU), a random-access memory (RAM), or a read-only memory (ROM). The ROM may hold programs to be executed by the CPU and fixed data such as a data table. In one implementation, the driving mode setting calculator 22 may serve as a "driving mode setting calculator." The forward traveling environment recognizer 21d, the driving mode setting calculator 22, and the automatic driving control unit 51 will be described later in further detail.

The map locator calculator 12 may be coupled, at its input side, a global navigation satellite system (GNSS) receiver 13 and an autonomous traveling sensor 14. The GNSS receiver 13 may receive positioning signals transmitted from a plurality of positioning satellites. The autonomous traveling sensor 14 may enable autonomous traveling in an environment where reception of valid positioning signals from the positioning satellites is difficult due to, for example, a reduced reception sensitivity from the GNSS satellites. Non-limiting examples of such an environment may include traveling inside a tunnel. The autonomous traveling sensor 14 may be constituted by, for example but not limited to, a wheel speed sensor, a gyro sensor, and a forward-rearward acceleration sensor. For example, the map locator calculator 12 may perform localization from a moving distance and an orientation on the basis of one or more of a vehicle speed detected by the wheel speed sensor, an angular velocity detected by the gyro sensor, and a forward-rearward acceleration detected by the forward-rearward acceleration sensor.

The map locator calculator 12 may include an own vehicle position estimation calculator 12a and a map information obtaining unit 12b. The own vehicle position estimation calculator 12a may estimate the own vehicle position. The map information obtaining unit 12b may identify a position of the own vehicle M through map matching in which the estimated own vehicle position is matched on the road map and may also obtain information on the road shape ahead of the thus-identified position.

The high-accuracy road map database 18 may be a large-capacity storage medium such as a hard disk drive (HDD) and hold highly accurate road map information (e.g., a dynamic map). The high-accuracy road map information may contain lane data that is necessary for performing automatic driving. Non-limiting examples of the lane data may include data on a width of a lane, data on coordinates of a middle position in the lane, data on azimuth in a traveling direction of the lane, and data on a speed limit. The lane data may be set for each lane on the road map at an interval of several meters.

The map information obtaining unit 12b may obtain information on the road map of a current location from the road map information stored in the high-accuracy road map database 18. From the thus-obtained road map information, the map information obtaining unit 12b may obtain route map information on the basis of, for example, a destination set by a driver for the automatic driving. The route map information may be map information related to a route from the own vehicle position (i.e., the current location) estimated by the own vehicle position estimation calculator 12a to the destination. The map information obtaining unit 12b may transmit the thus-obtained route map information (i.e., the lane data on the route map and its peripheral information) to the own vehicle position estimation calculator 12a.

The own vehicle position estimation calculator 12a may obtain coordinates of the position of the own vehicle M on the basis of the positioning signals received by the GNSS receiver 13. The own vehicle position estimation calculator 12a may perform map matching of the obtained position coordinates onto the route map information to thereby estimate the own vehicle position (i.e., the current location) on the road map and to thereby identify a lane in which the own vehicle M is traveling. The own vehicle position estimation calculator 12a may also obtain the road shape of the traveling lane of the own vehicle M stored in the route map information and successively store the obtained road shape of the traveling lane. In other words, in the example implementation, the own vehicle position estimation calculator 12a may obtain a road curvature RMPU [1/m] of the middle of the lane, as illustrated in FIGS. 9A and 9B, and successively store the obtained road curvature RMPU. Hereinafter, the thus-obtained road curvature RMPU is referred to as a "map curvature RMPU."

Furthermore, the own vehicle position estimation calculator 12a may switch to an autonomous navigation in an environment where reception of valid positioning signals from the positioning satellites is difficult due to, for example, a reduced sensitivity of the GNSS receiver 13. Non-limiting examples of such an environment may include traveling inside a tunnel. In the autonomous navigation, the own vehicle position estimation calculator 12a may estimate the own vehicle position on the basis of one or more of the vehicle speed detected by the wheel speed sensor, the angular velocity detected by the gyro sensor, and the forward-rearward acceleration detected by the forward-rearward acceleration sensor. By performing the autonomous navigation, the own vehicle position estimation calculator 12a may estimate the own vehicle position on the road map and obtain the curvature (i.e., the map curvature) RMPU of the road on which the own vehicle M is traveling.

The camera unit 21 may include a vehicle-mounted camera, an image processing unit (IPC) 21c, and the forward traveling environment recognizer 21d. The vehicle-mounted camera may be provided inside a vehicle interior of the own vehicle M and fixed at an upper-middle part of the front of the vehicle interior. The vehicle-mounted camera may include a main camera 21a and a sub camera 21b. The main camera 21a and the sub camera 21b may be disposed at their respective positions that are symmetrical across the middle of the own vehicle M in a width direction. This camera unit 21 may be a stereo camera that captures a predetermined region ahead of the own vehicle M with the main camera 21a and the sub camera 21b. The IPU 21c in the camera unit 21 may perform a predetermined image process on images captured by the main camera 21a and the sub camera 21b of a surrounding environment ahead in the traveling direction. The IPU 21c may transmit the processed surrounding environment images to the forward traveling environment recognizer 21d.

The forward traveling environment recognizer 21d may determine the road shape of the road on which the own vehicle M is to travel, on the basis of the traveling environment image information ahead of the own vehicle M received from the IPU 21c. In the example implementation on the basis of the traveling environment image information, the forward traveling environment recognizer 21d may determine the road curvature [1/m] of the lane lines that define right and left of the lane and may determine a width, or a lane width, between the right and the left lane lines. Any of various known methods of determining a road curvature and a lane width may be used to determine the road curvature [1/m] of the right and left lane lines and the lane width therebetween. For example, in an example implementation, the road curvature may be determined through recognizing right and left lane lines on the basis of the traveling environment image information and determining, for each predetermined section, the curvature of each of the right and left lane lines. The right and left lane lines may be recognized through a binarization process that utilizes a difference in luminance. The curvature of each of the right and left lane lines may be determined through, for example, a curve-approximating expression that is based on a least-square method. Furthermore, in an example implementation, the lane width may be calculated from a difference between the thus-determined curvatures of the respective right and left lane lines. On the basis of the curvature of the respective right and left lane lines and the lane width, the forward traveling environment recognizer 21d may determine a road curvature RCAM [1/m] of the middle of the lane, as illustrated in FIGS. 9A and 9B, and successively store the thus-determined road curvature RCAM. Hereinafter, the road curvature RCAM may be referred to as a "camera curvature RCAM." The map curvature RMPU obtained by the own vehicle position estimation calculator 12a and the camera curvature RCAM estimated by the forward traveling environment recognizer 21d may be supplied to the driving mode setting calculator 22.

The forward traveling environment recognizer 21d may detect the presence of a preceding vehicle traveling in front of the own vehicle M on the basis of the obtained traveling environment image information. In a case where the forward traveling environment recognizer 21d has detected a preceding vehicle in front of the own vehicle M, the forward traveling environment recognizer 21d may calculate an inter-vehicle distance between the preceding vehicle in front and the own vehicle M (i.e., the distance from the preceding vehicle in front to the own vehicle M), a relative vehicle speed, and a time headway. Techniques for detecting a preceding vehicle in front with the use of a stereo camera and obtaining the inter-vehicle distance, the relative vehicle speed, and the time headway are well known, and thus descriptions thereof will be omitted.

Figure 2A:
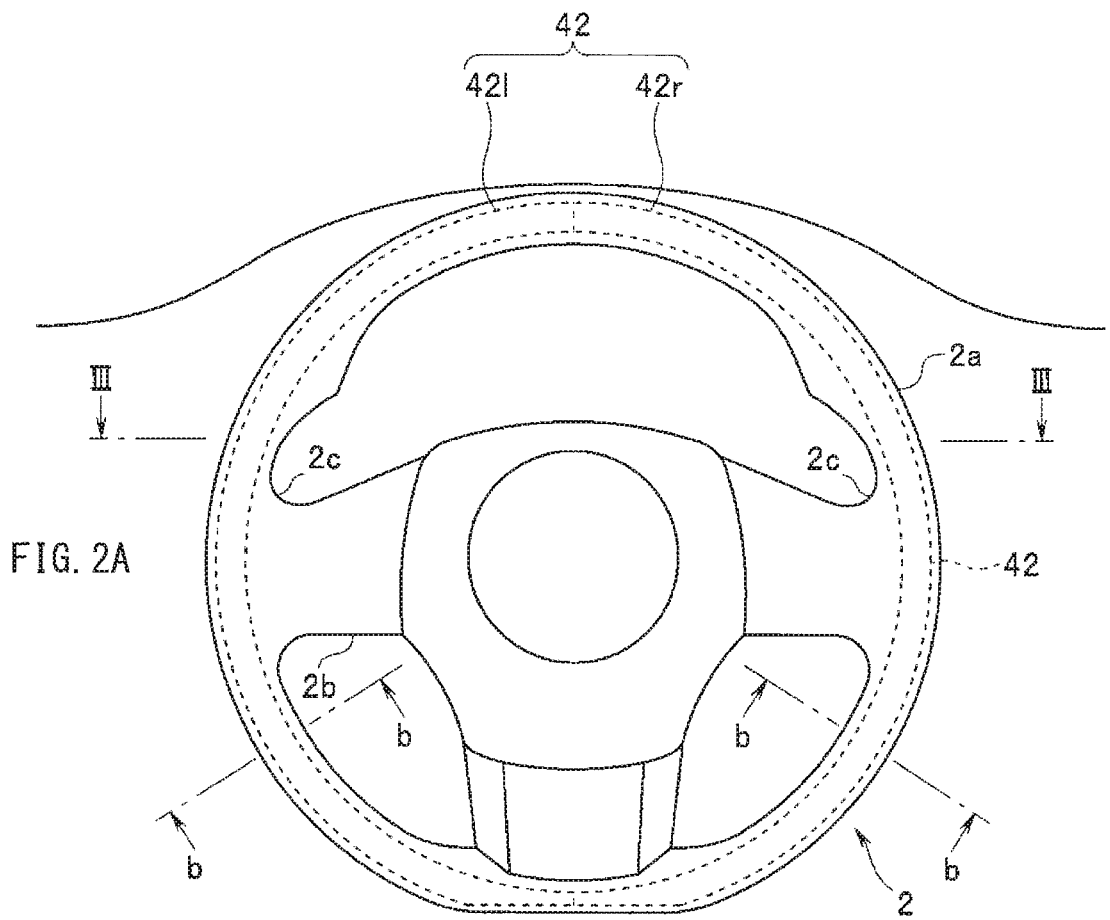
FIG. 2A is a front view illustrating an example of a steering wheel provided with a steering wheel touch sensor on an entire periphery of a rim.

Aside from the own vehicle position estimation calculator 12a and the forward traveling environment recognizer 21d described above, a driving mode switch 41, a steering wheel touch sensor unit 42, and a steering torque sensor 44 may be coupled to the input side of the driving mode setting calculator 22. The driving mode switch 41 may allow the driver to select a driving mode as desired. The steering wheel touch sensor unit 42 may be disposed on a rim 2a of a steering wheel 2 for the driver, as illustrated in FIG. 2A. In one implementation, the rim 2a may serve as a "holding part." In one implementation, the steering wheel touch sensor unit 42 may serve as a "steering wheel contact position detector" or a "contact position detector." The steering torque sensor 44 may serve as a "steering torque detector" or a "torque detector." The steering wheel 2 may be supported by a steering shaft (not illustrated) at a center of the rim 2a via a spoke 2b.

Forward traveling environment information obtained by the camera unit 21 may be supplied to an ACC control unit (not illustrated). In a case where the ACC control unit has detected a preceding vehicle traveling in front of the own vehicle M in the lane in which the own vehicle M is traveling on the basis of the forward traveling environment information, the ACC control unit may execute traveling control of following the preceding vehicle in front while keeping a predetermined inter-vehicle distance from the detected preceding vehicle in front of the own vehicle M. In a case where the ACC control detects no preceding vehicle in front of the own vehicle M, the ACC control unit may allow the own vehicle M to travel at a preset vehicle speed set by the driver.

The steering wheel touch sensor unit 42 may be, for example but not limited to, a pressure-sensitive sensor, a pressure sensor, or a capacitance sensor that is formed into a sheet. As illustrated in FIG. 2A, the steering wheel touch sensor unit 42 may surround substantially the entire periphery of the rim 2a of the steering wheel 2. The steering wheel touch sensor unit 42 may be divided into a left touch sensor unit 42l and a right touch sensor unit 42r that are disposed on the left side and the right side, respectively, of the steering wheel 2 across its center. In one implementation, the left touch sensor unit 42l may serve as a "left hand contact detector." In one implementation, the right touch sensor unit 42r may serve as a "right hand contact detector."

Figure 2B:
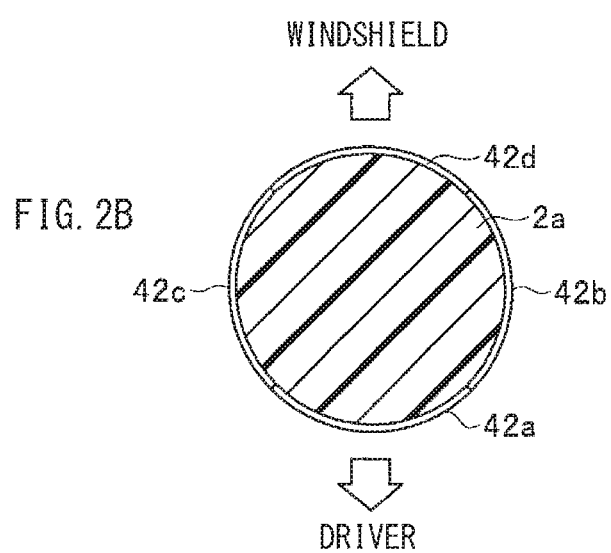
FIG. 2B is a cross-sectional view taken along the b-b line in FIG. 2A.

As illustrated in FIG. 2B, the left touch sensor unit 42l and the right touch sensor unit 42r may each include first to fourth touch sensors 42a to 42d. The first to fourth touch sensors 42a to 42d may be so disposed along a circumference of the rim 2a as to equally divide the circumference. In one implementation, the first to fourth touch sensors 42a to 42d may each serve as a "contact sensor." Hereinafter, the first to fourth touch sensors 42a to 42d may be abbreviated to first to fourth sensors 42a to 42d. In an example implementation, the first to fourth sensors 42a to 42d of the left and right touch sensor units 42l and 42r may be formed by dividing a single sheet. In another example implementation, the first to fourth sensors 42a to 42d may be formed by affixing separate sheets together. In the following description, the first to fourth sensors 42a to 42d constituting the left touch sensor unit 42l and the first to fourth sensors 42a to 42d constituting the right touch sensor unit 42r may be given identical reference characters for simplicity.

The first sensor 42a may be disposed in a region of the rim 2a that opposes the driver. The second sensor 42b may be disposed in an outer peripheral region of the rim 2a. The third sensor 42c may be disposed in an inner peripheral region of the rim 2a. The fourth sensor 42d may be disposed in a region opposing a windshield.

Figure 3A:
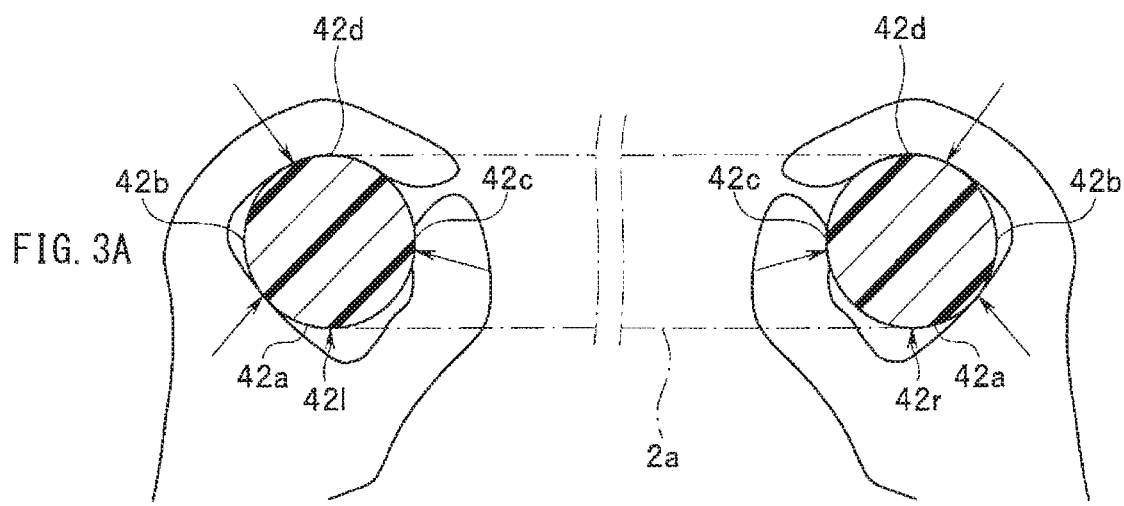
FIG. 3A is a schematic cross-sectional view of an example of a main part taken along the III-III line in FIG. 2A and illustrates a state in which a driver holds a steering wheel with both hands.

As illustrated in FIG. 3A, when the driver holds the steering wheel 2, the thumbs may make contact with the steering wheel 2 at approximately the positions of the third sensors 42c, the bases of the index fingers may make contact with the second sensors 42b, and the index fingers may make contact with the fourth sensors 42d. Since the first sensors 42a oppose the driver, the driver may be most likely to make accidental contact with the first sensors 42a while traveling in the second driving assist mode.

The steering torque sensor 44 may detect a steering torque Tst input to the steering shaft (not illustrated) by the driver on the basis of a twist of the steering shaft. The steering torque sensor 44 may determine the presence of a steering intervention (i.e., a steering override) on the basis of the detected steering torque Tst.

A notification device 45 may be coupled to an output side of the driving mode setting calculator 22. The notification device 45 may include a sound speaker and a monitor. In one implementation, the notification device 45 may serve as a "notifier." The automatic driving control unit 51 may be so coupled to the driving mode setting calculator 22 as to be able to communicate freely and bidirectionally with the driving mode setting calculator 22. The automatic driving control unit 51 may execute any of the driving modes including the manual driving mode, the first driving assist mode, the second driving assist mode, and the automatic refuge mode set by the driving mode setting calculator 22.

The driving mode setting calculator 22 may compare the map curvature RMPU estimated by the own vehicle position estimation calculator 12a and the camera curvature RCAM estimated by the forward traveling environment recognizer 21d. The map curvature RMPU here may be directed to a location ahead of the own vehicle position. In an example implementation, the driving mode setting calculator 22 may perform the comparison on a constant basis. For example, the driving mode setting calculator 22 may check a degree of coincidence (i.e., reliability) in percentage [%] between the map curvature RMPU and the camera curvature RCAM on the basis of the own vehicle position on the map and the own vehicle position derived from the actual driving each serving as a reference. The driving mode setting calculator 22 may check the degree of coincidence between the map curvature RMPU and the camera curvature RCAM that are both derived from the same region ahead of the own vehicle M and away from the own vehicle M by a predetermined distance. The driving mode setting calculator 22 may determine that the map curvature RMPU and the camera curvature RCAM coincide with each other in a case where the degree of coincidence exceeds a preset threshold and may determine that the map curvature RMPU and the camera curvature RCAM do not coincide with each other in a case where the degree of coincidence is below the preset threshold. In an example implementation, the threshold may be the degree of coincidence in a range of from 95% to 99%. For example, as illustrated in FIG. 9A, the driving mode setting calculator 22 may evaluate that the own vehicle M is actually traveling along a target traveling path in a case where the map curvature RMPU obtained by the locator unit 11 and the camera curvature RCAM obtained through the recognition performed by the forward traveling environment recognizer 21d coincide with each other.

For example, as illustrated in FIG. 9B, the driving mode setting calculator 22 may evaluate that the degree of coincidence (i.e., the reliability) between the map curvature RMPU and the camera curvature RCAM is low (i.e., is less than the threshold) in a case where the locator unit 11 erroneously recognizes the map curvature RMPU of an adjacent lane as the road curvature of the traveling path of the own vehicle M. The locator unit 11 may possibly recognize the map curvature RMPU erroneously in a case where the map matching of the position derived from the positioning performed by the GNSS receiver 13 is performed onto the adjacent lane due to an error. The driving mode setting calculator 22 may evaluate that the degree of coincidence, or the reliability, is low in a case where the forward traveling environment recognizer 21d fails to obtain the camera curvature RCAM due to traveling under a poor-visibility situation such as rainfall.

In a case where the driving mode setting calculator 22 has determined that the map curvature RMPU and the camera curvature RCAM coincide with each other, the driving mode setting calculator 22 may allow the second driving assist mode to continue. In an example implementation, the driving mode setting calculator 22 may cause the driving mode to make a transition from the first driving assist mode to the second driving assist mode. When the driving mode setting calculator 22 makes a transition in the driving mode, the driver may be notified of the transition in advance through the notification device 45.

In the example implementation, non-limiting examples of the set driving mode may include the manual driving mode in which the driver himself/herself manually steers the steering wheel, the first driving assist mode, the second driving assist mode, and the automatic refuge mode. The first driving assist mode and the second driving assist mode may belong to the category of automatic driving. The first driving assist mode and the second driving assist mode may be the same as each other in that they cause the own vehicle M to automatically travel along a target traveling path along which the own vehicle M is to travel, i.e., they perform the automatic driving. The first driving assist mode, however, is based on the condition that the driver holds the steering wheel, whereas the second driving assist mode is not based on the condition that the driver holds the steering wheel.

In a case where the camera unit 21 temporarily malfunctions, continuation of the autonomous driving in the second driving assist mode may become difficult. However, the driving mode may not be caused to make a transition suddenly to the manual driving mode. The driver may be first notified that the driving mode will be caused to make a transition to the first driving assist mode, and the driver may be requested to hold the steering wheel. Upon the driver holding the steering wheel 2, the driving mode may be caused to make a transition to the first driving assist mode, and the automatic driving may be continued on the basis of the own vehicle position estimated by the map locator calculator 12. This may apply similarly in a case where the map locator calculator 12 has failed to estimate the own vehicle position. In such a case, upon the driver holding the steering wheel 2, the middle of the right and left lane lines recognized by the camera unit 21 may be set as the target traveling path, and the own vehicle M may be allowed to travel along this target traveling path.

In a case where a steering intervention by the driver (i.e., a steering override) is detected during traveling through the automatic driving in, for example, one of the first driving assist mode and the second driving assist mode, the driving mode may be caused to make a transition from the automatic driving mode to the manual driving mode.

Typically, in a case where the driver holds the rim 2a of the steering wheel 2 with both hands to steer the steering wheel 2, as illustrated in FIG. 3A, the thumbs, the index fingers and their middle portions, and the palms may make contact with the rim 2a. Therefore, the second sensor 42b on the outer peripheral side, the third sensor 42c on the inner peripheral side, and the fourth sensor 42d facing the windshield may be turned on in each of the left and right touch sensor units 42l and 42r. In a case where the driver does not need to steer the steering wheel that much, the driver may hold the steering wheel 2 with the thumbs resting on recess parts 2c formed in portions where the rim 2a and the spoke 2b are coupled to each other, as illustrated in FIG. 2A.

Therefore, when the driver steers the steering wheel, one of the second sensors 42b and the fourth sensors 42d and one or more of the other sensors may be turned on. In a case where the driver steers the steering wheel in this posture and the steering intervention is detected on the basis of the steering torque Tst detected by the steering torque sensor 44, it is possible to determine that this steering is a steering override intended by the driver.

Figure 3B:
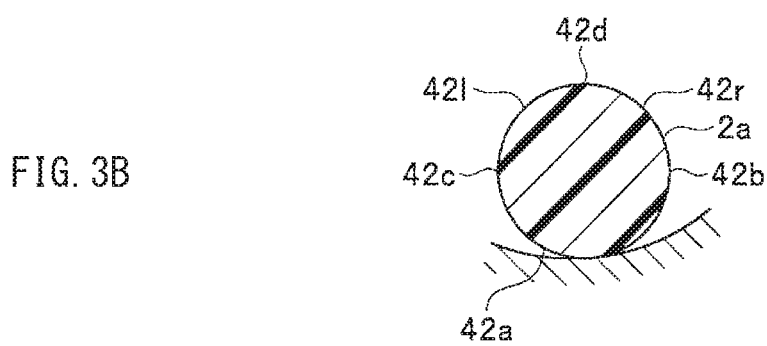
FIG. 3B is a cross-sectional view illustrating a state in which a hand, for example, is in contact with the steering wheel.
Figure 4:
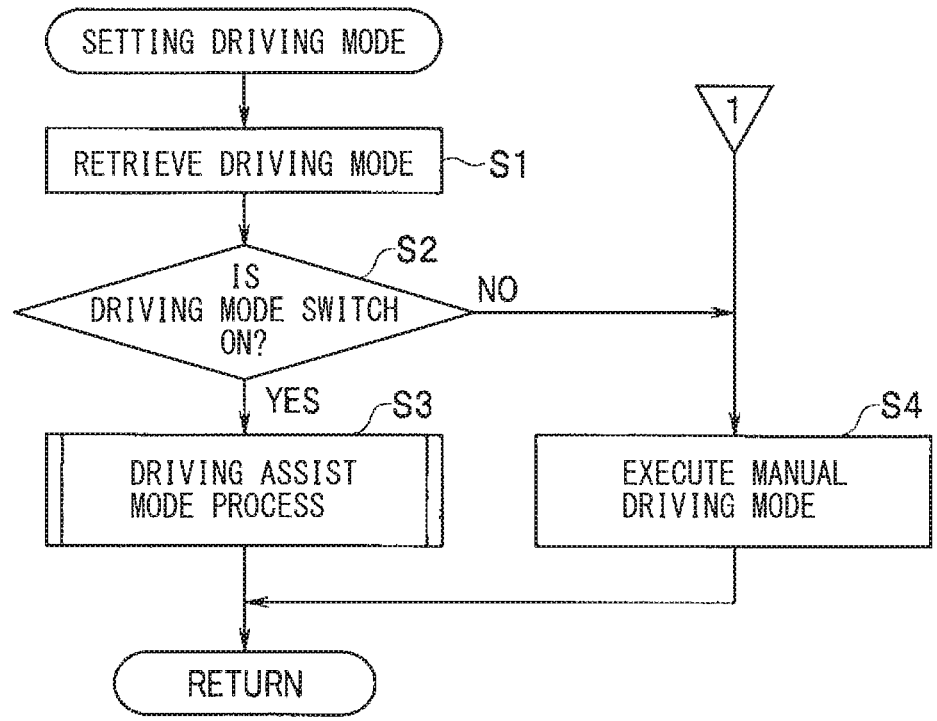
FIG. 4 is a flowchart illustrating an example of a driving mode setting routine.

Since the first sensors 42a of the left and the right touch sensor units 42l and 42r oppose the driver, as illustrated in FIG. 3B, a body part, such as a hand or an elbow, or a piece of clothing, for example, may be likely to make accidental contact with the first sensors 42a while the own vehicle M is traveling in the second driving assist mode in which the driver is not required to hold the steering wheel. For example, a body part, such as a knee or a buttock, for example, may be likely to make contact with the first sensor 42a when the driver makes an action of, for example, getting up and turning rearward. At this point, the driver may be likely to apply pressure on the steering wheel 2 to accidentally input the steering torque Tst. Furthermore, a thumb of the driver may be likely to make contact with the third sensor 42c. At this point, if the thumb of the driver is hooked on the recess part 2c, the steering torque Tst may be input easily. FIG. 3B illustrates only a cross section of the right touch sensor unit 42r. The left touch sensor unit 42l may have a shape symmetrical to that of the right touch sensor unit 42r, and thus the illustration of the left touch sensor unit 42l is omitted.

If the driving mode is caused to make a transition to one of the first driving assist mode and the manual driving mode immediately in a situation where merely an accidental contact has been made, the driver may experience a sense of discomfort.

Therefore, in the example implementation, whether a steering intervention (i.e., a steering override) is intended by the user or is caused by an accidental contact (i.e., a false detection) may be determined properly on the basis of both of the portion of the steering wheel 2 at which the driver is holding the steering wheel 2 and the direction in which the steering torque Tst is given and the magnitude of the steering torque Tst.

The driving mode setting calculator 22 may determine whether a steering override is intended by the driver or is caused merely by an accidental contact in a routine for setting the driving mode as illustrated in FIGS. 4 to 8. Upon the own vehicle M starting traveling, a driving mode setting routine illustrated in FIG. 4 may start. At step S1, the driving mode setting calculator 22 may retrieve a signal from the driving mode switch 41. The driving mode switch 41 may allow the driver to select, as desired, a mode of automatic driving from, for example, the first driving assist mode and the second driving assist mode. The driving mode switch 41 may be turned off in a case where the manual driving mode has been selected.

Thereafter, the flow may proceed to step S2, and the driving mode setting calculator 22 may check whether the driving mode switch 41 is on. In a case where the driving mode switch 41 is on (S2: YES), the flow may proceed to step S3, and the driving mode setting calculator 22 may execute a driving assist mode process and exit the routine. In a case where the driving mode switch 41 is off (S2: NO), the flow may proceed to step S4, and the driving mode setting calculator 22 may execute the manual driving mode and exit the routine.

The manual driving mode thus selected as the driving mode may cause the target traveling path to be displayed on a display (not illustrated). The target traveling path may be set by a known navigation function that guides the own vehicle M to the destination. The driver may thus drive the own vehicle M by his/her own driving while following the displaying performed on the display, a voice guidance, or both.

Figure 5:
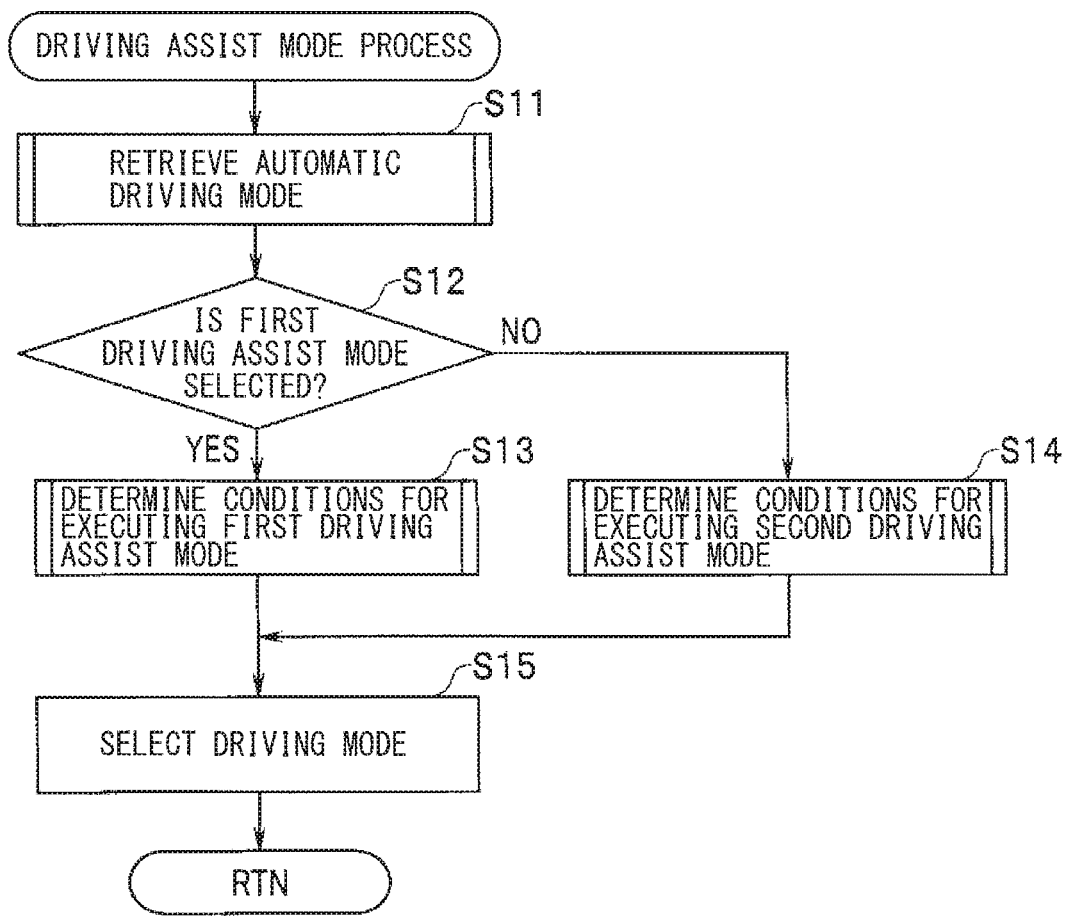
FIG. 5 is a flowchart illustrating an example of a subroutine related to a driving assist mode process.

The driving mode setting calculator 22 may execute the driving assist mode process performed at step S3 in accordance with a subroutine related to the driving assist mode process illustrated by way of example in FIG. 5. In this subroutine, at step S11, the driving mode setting calculator 22 may retrieve the automatic driving mode selected by the driver with the driving mode switch 41. At step S12, the driving mode setting calculator 22 may check whether the automatic driving mode selected by the driver is the first driving assist mode.

In a case where the first driving assist mode is selected (S12: YES), the flow may proceed to step S13. In a case where the second driving assist mode, not the first driving assist mode, is selected (S12: NO), the flow may proceed to step S14.

Upon proceeding to step S13, the driving mode setting calculator 22 may execute a process of determining conditions for executing the first driving assist mode, and the flow may proceed to step S15. Upon proceeding to step S14, the driving mode setting calculator 22 may execute a process of determining conditions for executing the second driving assist mode, and the flow may proceed to step S15.

Figure 6:
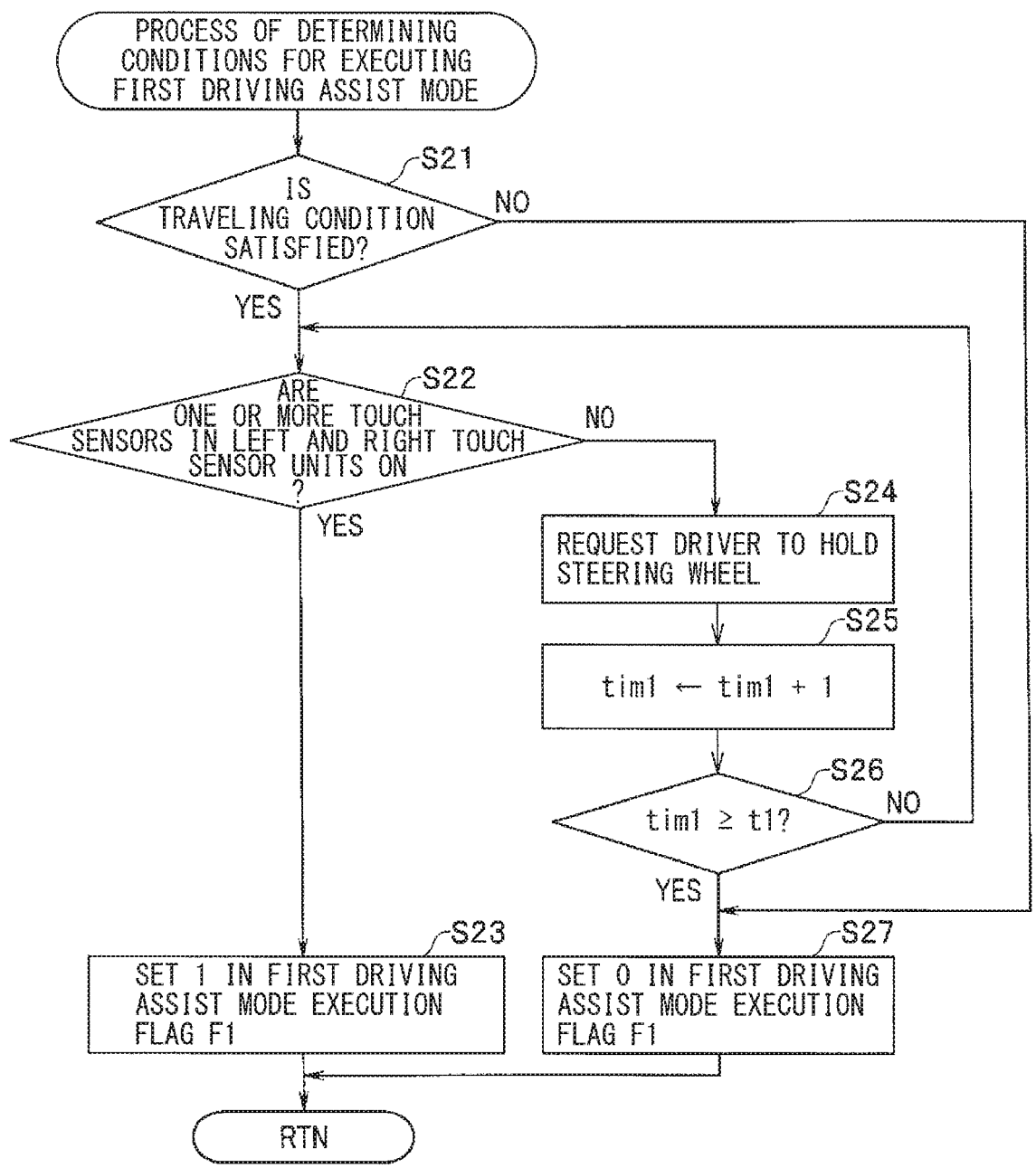
FIG. 6 is a flowchart illustrating an example of a subroutine related to a process of determining conditions for executing a first driving assist mode.

The driving mode setting calculator 22 may carry out the process of determining conditions for executing the first driving assist mode executed at step S13 in accordance with a subroutine related to the process of determining conditions for executing the first driving assist mode illustrated by way of example in FIG. 6.

In this subroutine, at step S21, the driving mode setting calculator 22 may check whether a traveling condition is satisfied. As described above, the first driving assist mode may cause the own vehicle M to so travel along a lane line as to follow a preceding vehicle in front of the own vehicle M through known ALK control and ACC system. The driving mode setting calculator 22 may check whether it is possible to cause the own vehicle M to travel along the lane line. In a case where the traveling condition is satisfied (S21: YES), the flow may proceed to step S22. In a case where the traveling condition is not satisfied (S21: NO), the flow may jump to step S27. Non-limiting examples of the case where the traveling condition is not satisfied may include a case where the camera unit 21 is malfunctioning.

Upon proceeding to step S22, the driving mode setting calculator 22 may check whether any one of the first to fourth sensors 42a to 42d in each of the left and right touch sensor units 42l and 42r is on. In a case where the driving mode setting calculator 22 has detected any one of the first to fourth sensors 42a to 42d that are on in each of the left and right touch sensor units 42l and 42r (S22: YES), the flow may proceed to step S23, and the driving mode setting calculator 22 may set a first driving assist mode execution flag F1 (i.e., set 1 in F1). Thereafter, the flow may proceed to step S15 of FIG. 5.

In one of a case where any one of the first to fourth sensors 42a to 42d is on only in one of the left and right touch sensor units 42l and 42r and a case where all of the first to fourth sensors 42a to 42d are off (S22: NO), the flow may proceed to step S24.

Upon proceeding to step S24, the driving mode setting calculator 22 may request the driver to hold the steering wheel by announcing, for example but not limited to, "Please hold the steering wheel with both hands" through the notification device 45, and the flow may proceed to step S25. At step S25, the driving mode setting calculator 22 may increment an alerting time tim1 (i.e., tim1←tim1+1), and the flow may proceed to step S26. At step S26, the driving mode setting calculator 22 may compare the alerting time tim1 against a set duration t1. In an example implementation, the set duration t1 may be, for example, from about 3 to about 5 [sec]. In a case where tim1<t1 holds (S26: NO), the flow may return to step S22, and the driving mode setting calculator 22 may stand by until the driver holds the steering wheel with both hands. In a case where none of the first to fourth sensors 42a to 42d is turned on in one of the left and right touch sensor units 42l and 42r even after the alerting time tim1 has expired (i.e., tim1≥t1 holds) (S26: YES), the flow may proceed to step S27.

Upon proceeding to step S27 from step S21 or S26, the driving mode setting calculator 22 may clear the first driving assist mode execution flag F1 (i.e., set 0 in F1), and the flow may proceed to step S15 of FIG. 5.

Figure 7:
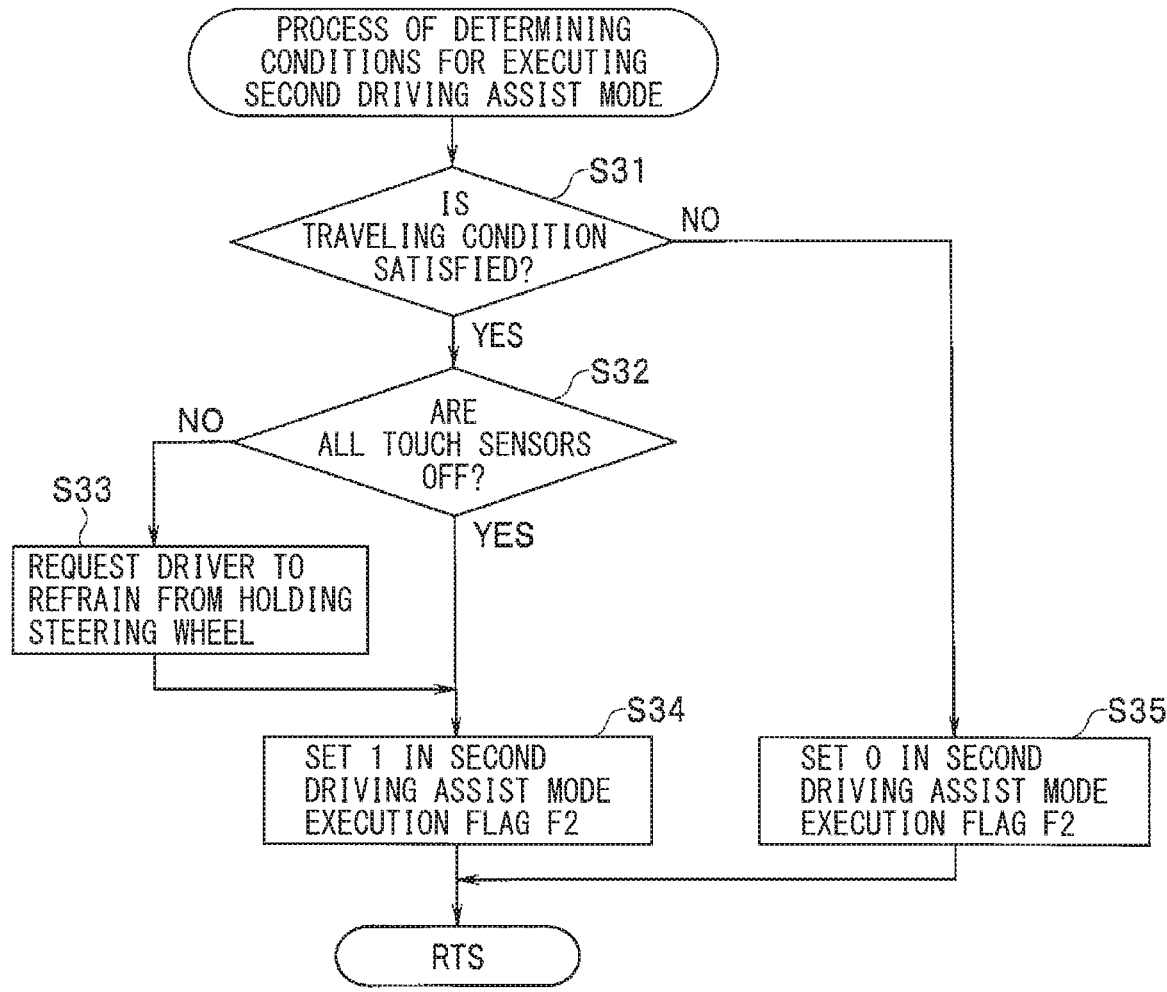
FIG. 7 is a flowchart illustrating an example of a subroutine related to a process of determining conditions for executing a second driving assist mode.

The driving mode setting calculator 22 may carry out the process of determining conditions for executing the second driving assist mode at step S14 in accordance with a subroutine related to the process of determining conditions for executing the second driving assist mode illustrated by way of example in FIG. 7.

In this subroutine, at step S31, the driving mode setting calculator 22 may check whether a traveling condition is satisfied. For example, the driving mode setting calculator 22 may check the degree of coincidence (i.e., the reliability) between the map curvature RMPU obtained by the locator unit 11 and the camera curvature RCAM obtained through the recognition performed by the forward traveling environment recognizer 21d of the camera unit 21. In a case where the degree of coincidence exceeds a preset threshold (S31: YES), the driving mode setting calculator 22 may determine that the traveling condition is satisfied, and the flow may proceed to step S32. In an example implementation, the threshold may be the degree of coincidence in a range of from 95% to 99%.

In a case where the degree of coincidence is below the threshold (S31: NO), the driving mode setting calculator 22 may determine that the traveling condition is not satisfied, and the flow may proceed to step S35.

Upon proceeding to step S32, the driving mode setting calculator 22 may check whether all of the first to fourth sensors 42a to 42d in the left and right touch sensor units 42l and 42r are off. In a case where all of the first to fourth sensors 42a to 42d are off (S32: YES), the flow may jump to step S34. In a case where the driving mode setting calculator 22 has detected one or more of the first to fourth sensors 42a to 42d that are on (S32: NO), the flow may proceed to step S33, and the driving mode setting calculator 22 may request the driver to refrain from holding the steering wheel by announcing, for example but not limited to, "You are on the steering wheel. Automatic driving with your hands off the steering wheel is possible" through the notification device 45. Thereafter, the flow may proceed to step S34.

Upon proceeding to step S34 from one of step S32 and step S33, the driving mode setting calculator 22 may set a second driving assist mode execution flag F2 (i.e., set 1 in F2), and the flow may proceed to step S15 of FIG. 5. Upon proceeding to step S35, the driving mode setting calculator 22 may clear the second driving assist mode execution flag F2 (i.e., set 0 in F2), and the flow may proceed to step S15 of FIG. 5.

Upon proceeding to step S15, the driving mode setting calculator 22 may refer to a value in the first driving assist mode execution flag F1 in a case where the driving mode setting calculator 22 has determined in the above-described step S12 that the driver has selected the first driving assist mode or refer to a value in the second driving assist mode execution flag F2 in a case where the driving mode setting calculator 22 has determined in the above-described step S12 that the driver has selected the second driving assist mode.

In a case where F1=1 holds, the driving mode setting calculator 22 may cause the first driving assist mode to be executed and exit the routine. In a case where F2=1 holds, the driving mode setting calculator 22 may cause the second driving assist mode to be executed and exit the routine. In a case where F1=0 holds, the driving mode setting calculator 22 may cause the manual driving mode to be executed without causing the automatic driving to be executed and exit the routine. In a case where F2=0 holds, the driving mode setting calculator 22 may cause the driving mode to make a transition to one of the first driving assist mode and the manual driving mode in accordance with the driving condition and exit the routine.

Figure 8:
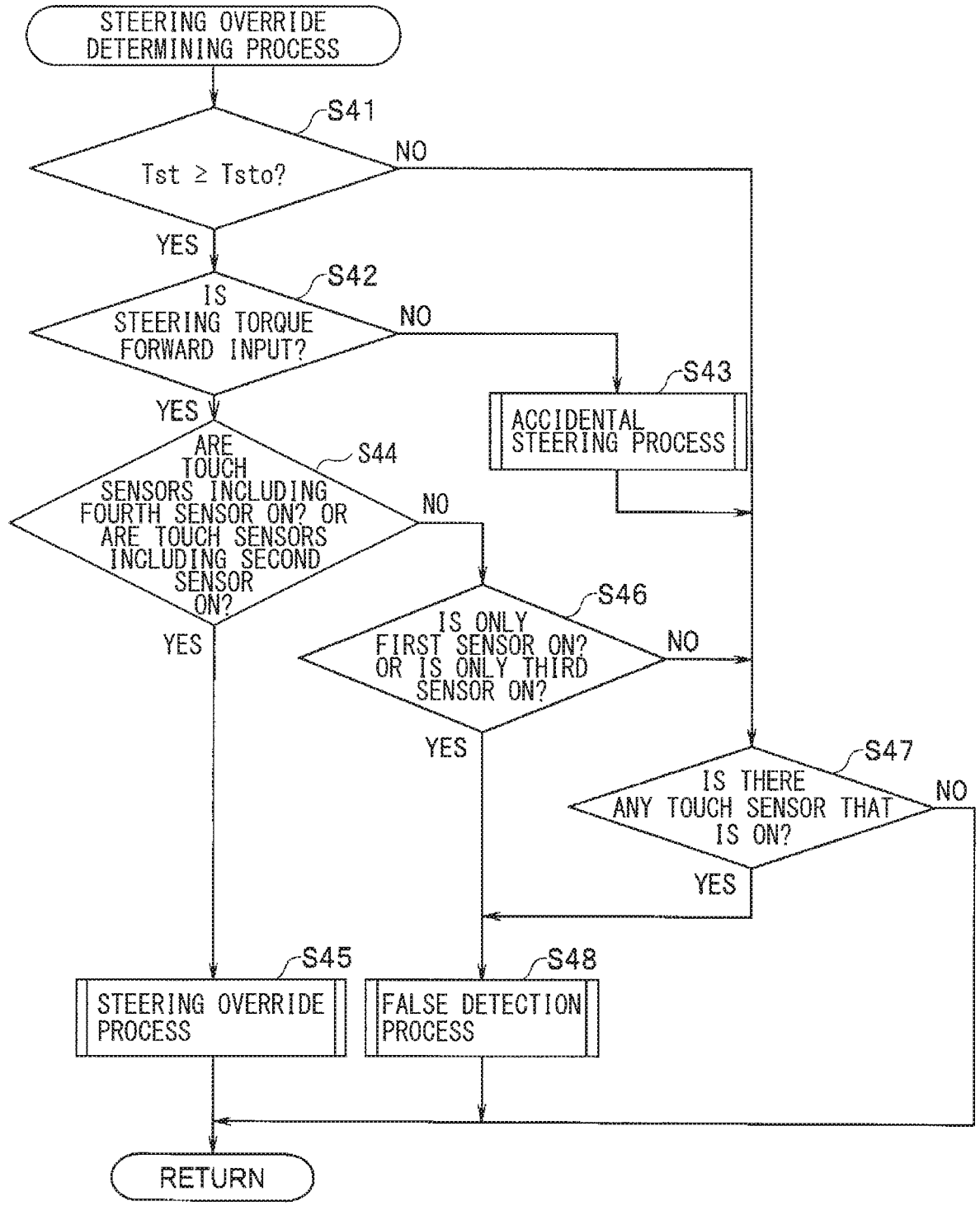
FIG. 8 is a flowchart illustrating an example of a routine related to a steering override determining process.

When the automatic driving mode (i.e., one of the first driving assist mode and the second driving assist mode) is executed, a routine related to a steering override determining process illustrated in FIG. 8 may be executed in background.

In this routine, at step S41, the driving mode setting calculator 22 may compare the steering torque Tst detected by the steering torque sensor 44 against a preset steering override determining threshold Tsto. The steering override determining threshold Tsto may be a value for checking whether the steering is intended by the driver or is caused merely by an accidental contact (i.e., a false detection). In an example implementation, the steering override determining threshold Tsto may take a fixed value. In another example implementation, the steering override determining threshold Tsto may take a variable value to be set in accordance with the vehicle speed.

In a case where Tst≥Tsto holds (S41: YES), the flow may proceed to step S42. In a case where Tst<Tsto holds (S41: NO), the flow may jump to step S47.

At step S42, the driving mode setting calculator 22 may check an input direction of the steering torque Tst. The steering torque sensor 44 may detect the steering torque Tst on the basis of the twist of the steering shaft (not illustrated). Therefore, the steering torque sensor 44 may detect not only the steering torque Tst input as the driver steers the steering wheel 2 but also the steering torque Tst input from the tires due to external disturbance traceable to, for example but not limited to, an uneven road surface during traveling. Hereinafter, the former may be referred to as a "forward input," and the latter may be referred to as a "reverse input."

In an example implementation, whether the steering torque Tst is the forward input or the reverse input may be determined as follows, for example. A steering angle sensor may be provided on the steering torque sensor 44 toward the steering wheel 2, and a determination may be made on the basis of a temporal difference between the time when a displacement in the angle of rotation is detected by the steering angle sensor and the time when a displacement in the steering torque is detected by the steering torque sensor 44. For example, in a case where the displacement in the angle of rotation occurs before the displacement in the steering torque occurs, the steering torque Tst may be determined to be the forward input. In the opposite case, the steering torque Tst may be determined to be the reverse input. In a case where the steering torque Tst is not the forward input but the reverse input (S42: NO), the flow may proceed to step S43. In a case where the steering torque Tst is the forward input (S42: YES), the flow may proceed to step S44.

When the steering torque Tst is determined to be the reverse input and the flow proceeds to step S43, an accidental steering process may be executed since the steering torque Tst is clearly not intended by the driver, and the flow may jump to step S47. The accidental steering process may be for retaining the current automatic driving mode and prevent transmission of an erroneous signal that causes the automatic driving control unit 51 to make a transition in the driving mode.

Upon proceeding to step S44, at step S44 and thereafter, the driving mode setting calculator 22 may check whether any one of the first to fourth sensors 42a to 42d in each of the left and right touch sensor units 42l and 42r is on and determine whether the steering is a steering override intended by the driver or is caused merely by an accidental contact. In traveling in the second driving assist mode, the driver may accidentally cause the steering wheel 2 to move through a body moving action such as turning rearward. Therefore, it is not possible to properly determine whether the steering is intended by the driver or is caused by an accidental contact through a mere comparison of the steering torque Tst against the steering override determining threshold Tsto, even if the comparison provides that the steering torque Tst is the forward input.

Accordingly, in this routine, whether the steering torque Tst is a steering override or is caused merely by an accidental contact may be determined on the basis of both of the steering torque Tst and the on/off state of each of the first to fourth sensors 42a to 42d provided in the left and right touch sensor units 42l and 42r. In the case of a steering override, as illustrated in FIG. 3A, the driver may basically steer the steering wheel 2 while holding the steering wheel 2 with both hands.

Therefore, in the following, the first to fourth touch sensors 42a to 42d may mean those in each of the left and right touch sensor units 42l and 42r. At step S44, the driving mode setting calculator 22 may check whether the fourth sensor 42d and one or more of the other touch sensors are on or may check whether the second sensor 42b and one or more of the other touch sensors are on. In FIG. 8, the state in which the fourth sensor 42d and one or more of the other touch sensors are on is expressed as "touch sensors including the fourth sensor are on," and the state in which the second sensor 42b and one or more of the other touch sensors are on is expressed as "touch sensors including the second sensor are on."

As illustrated in FIG. 3A, when the driver holds the rim 2a of the steering wheel 2 with both hands, at least the index fingers and the bases of the index fingers may make contact with the rim 2a, and the thumbs may rest on the recess parts 2c in the steering wheel 2 as illustrated in FIG. 2A. Therefore, at step S44 described above, in a case where one of the fourth sensor 42d and the second sensor 42b and one or more of the other touch sensors are on (S44: YES), it is possible to determine that the steering override has been made intentionally by the driver. In such a case, the steering may be determined to be the steering override intended by the driver, and the flow may proceed to step S45. At step S45, the driving mode setting calculator 22 may execute a steering override process and exit the routine.

In a case where both the fourth sensor 42d and the second sensor 42b are off (S44: NO), the driving mode setting calculator 22 may determine that the driver is not holding the steering wheel 2, and the flow may proceed to step S46. At step S46, the driving mode setting calculator 22 may check on an accidental contact on the basis of whether only the first sensor 42a is on or whether only the third sensor 42c is on. As described above, in a case where the driver is to intentionally steer the steering wheel, one of the fourth sensor 42d and the second sensor 42b and one or more of the other touch sensors may inevitably turn on. Furthermore, in intentional steering, two or more touch sensors including one of the fourth sensor 42d and the second sensor 42b may turn on.

Accordingly, it is possible to determine that the steering is caused by an accidental contact in a case where only the first sensor 42a is on or only the third sensor 42c is on (S46: YES). Therefore, in such a case, the flow may proceed to step S48, and the driving mode setting calculator 22 may execute a false detection process and exit the routine. In a case where the determination results do not match the determination conditions in step S44 and step S46 (S46: NO), the flow may proceed to step S47 to prevent a control error.

Upon proceeding to step S47 from step S41, S43, or S46, the driving mode setting calculator 22 may check whether any of the first to fourth touch sensors 42a to 42d provided in the left and right touch sensor units 42l and 42r is on. In a case where it is determined that any of the first to fourth touch sensors 42a to 42d is on upon being determined in step S41 that Tst<Tsto holds or being determined in step S42 that the steering torque Tst is the reverse input (S47: YES), the steering may clearly be determined to be caused by an accidental contact.

Therefore, in such a case, the flow may proceed to step S48, and the driving mode setting calculator 22 may execute the false detection process and exit the routine. In a case where all of the touch sensors 42a to 42d are off (S47: NO), there is no accidental contact, and thus the driving mode setting calculator 22 may exit the routine.

The steering override process executed in step S45 may determine whether the driving mode is to be caused to make a transition from the current automatic driving mode (i.e., one of the first driving assist mode and the second driving assist mode) to the manual driving mode or whether the driving mode is to be caused to make a transition temporarily to the manual driving mode and restored thereafter to the original automatic driving mode. This determination may be made on the basis of the steering torque Tst detected by the steering torque sensor 44, the input time of the steering torque Tst, and the traveling condition of the vehicle.

For example, if the steering has been overridden to slightly correct the steering angle to deal with traveling that is difficult to deal with through the automatic driving, the driving mode setting calculator 22 may temporarily cause the driving mode to make a transition to the manual driving mode and be restored thereafter to the original automatic driving mode. Non-limiting examples of the situation that is difficult to deal with through the automatic driving may include turning along a slight curve and steering to avoid a fallen object. In contrast, in a case where the steering duration is clearly long and the driver's intention to steer the steering wheel is apparent, the driving mode setting calculator 22 may turn off the automatic driving mode and cause the driving mode to make a transition to the manual driving mode.

The false detection process executed in step S48 may be for retaining the current automatic driving mode. For example, a process of setting an accidental contact flag may be performed. Even in a case where any of the first to fourth touch sensors 42a to 42d is detected to be on while the own vehicle M is traveling in the second driving assist mode, if the accidental contact flag is set, the driving mode setting calculator 22 may retain the second driving assist mode without causing the driving mode to make a transition to the first driving assist mode.

In this manner, according to the example implementation, the first to fourth sensors 42a to 42d may be disposed on the circumference of the rim 2a provided on the steering wheel 2, and the state in which the driver holds the steering wheel 2 may be checked with the first to fourth sensors 42a to 42d. Only in a case where one of the fourth sensor 42d opposing the windshield and the second sensor 42b disposed on the outer peripheral side of the rim 2a and one or more of the other touch sensors are on and the steering torque Tst that is a forward input of equal to or greater than the steering override determining threshold Tsto is detected, the steering may be determined to be a steering override. Therefore, even in a case where the steering torque Tst of the driver is detected in the automatic driving in one of the second driving assist mode, which is not based on the condition that the driver holds the steering wheel 2, and the first driving assist mode, which is based on the condition that the driver holds the steering wheel 2, the driving mode may be prevented from being caused to immediately make a transition to the manual driving mode, and it is possible to reduce any sense of discomfort to be experienced by the driver.

In particular, in the traveling in the second driving assist mode, in a case where only one of the first sensor 42a, which is provided at a position on the rim 2a where the first sensor 42a opposes the driver, and the third sensor 42c, which is provided on the inner peripheral side of the rim 2a, is on, even in a case where the steering torque Tst that is a forward input of equal to or greater than the steering override determining threshold Tsto is detected, it may be determined that the steering has been caused by an accidental contact, and a transition into the manual driving mode may be prevented. Thus, it is possible to greatly reduce any sense of discomfort to be experienced by the driver.

The technology is not limited to the example implementations described above. For example, the left and right touch sensor units 42l and 42r may each include a plurality of touch sensors divided in three segments on the circumference or five or more segments on the circumference.

The driving mode setting calculator 22 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the driving mode setting calculator 22. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the driving mode setting calculator 22 illustrated in FIG. 1.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A driving assist system, comprising:
a steering wheel contact position detector including a plurality of contact sensors, the contact sensors including at least 1) a first contact sensor disposed in a driver side segment of a holding part provided on a steering wheel of an own vehicle and 2) a second contact sensor disposed in an inner peripheral side segment of the holding part of the steering wheel, the steering wheel contact position detector being configured to detect a position on the steering wheel at which a driver makes a contact with the steering wheel;
a steering torque detector configured to detect a steering torque of the driver; and
a driving mode setting calculator configured to determine whether the steering torque detected by the steering torque detector is a steering override intended by the driver or is a false detection that is not the steering override, on a basis of the steering torque detected by the steering torque detector and a position at which the contact is detected by the contact sensors, and
wherein the driving mode setting calculator is configured to determine that the steering torque detected by the steering torque is the false detection in case where the steering torque detected by the steering torque detector exceeds a steering override determining threshold set to a predetermined value and where one of the first contact sensor in the driver side segment and the second contact sensor in inner peripheral side segment has detected the contact.

2. The driving assist system according to claim 1, wherein the driving mode setting calculator is configured to
identify any contact sensor, out of the contact sensors, that detects the contact when the driver holds the holding part, and
determine that the steering torque detected by the steering torque detector is the steering override, in a case where the steering torque detected by the steering torque detector exceeds a steering override determining threshold set to a predetermined value and where the identified contact sensor has detected the contact.

3. The driving assist system according to claim 1, wherein the contact sensors further includes 1) a third contact sensor disposed in an outer peripheral side segment of the holding part of the steering wheel and 2) a fourth contact sensor disposed in a windshield side segment of the holding part of the steering wheel, and
the driving mode setting calculator is configured to determine that the steering torque detected by the steering torque detector is the steering override, in a case where the steering torque detected by the steering torque detector exceeds the steering override determining threshold and where one of the third contact sensor in the outer peripheral side segment and the fourth contact sensor in the windshield side segment has detected the contact.

4. The driving assist system according to claim 1,
wherein the driving mode setting calculator is configured to set a driving mode of the own vehicle on a basis of a driving condition, the driving mode including a first driving assist mode, a second driving assist mode, and a manual driving mode, the first driving assist mode allowing for automatic driving that is based on a condition that the driver holds the steering wheel, the second driving assist mode allowing for the automatic driving that is not based on the condition that the driver holds the steering wheel, the manual driving mode allowing the driver himself/herself to steer the steering wheel, and
wherein the driving mode setting calculator is configured to cause the driving mode to make a transition to one of the first driving assist mode and the manual driving mode in accordance with a driving state, in a case where the driving mode setting calculator determines that the steering torque detected by the steering torque detector is the false detection that is not the steering override during traveling in the second driving assist mode.

5. The driving assist system according to claim 2,
wherein the driving mode setting calculator is configured to set a driving mode of the own vehicle on a basis of a driving condition, the driving mode including a first driving assist mode, a second driving assist mode, and a manual driving mode, the first driving assist mode allowing for automatic driving that is based on a condition that the driver holds the steering wheel, the second driving assist mode allowing for the automatic driving that is not based on the condition that the driver holds the steering wheel, the manual driving mode allowing the driver himself/herself to steer the steering wheel, and
wherein the driving mode setting calculator is configured to cause the driving mode to make a transition to one of the first driving assist mode and the manual driving mode in accordance with a driving state, in a case where the driving mode setting calculator determines that the steering torque detected by the steering torque detector is the false detection that is not the steering override during traveling in the second driving assist mode.

6. The driving assist system according to claim 3,
wherein the driving mode setting calculator is configured to set a driving mode of the own vehicle on a basis of a driving condition, the driving mode including a first driving assist mode, a second driving assist mode, and a manual driving mode, the first driving assist mode allowing for automatic driving that is based on a condition that the driver holds the steering wheel, the second driving assist mode allowing for the automatic driving that is not based on the condition that the driver holds the steering wheel, the manual driving mode allowing the driver himself/herself to steer the steering wheel, and
wherein the driving mode setting calculator is configured to cause the driving mode to make a transition to one of the first driving assist mode and the manual driving mode in accordance with a driving state, in a case where the driving mode setting calculator determines that the steering torque detected by the steering torque detector is the false detection that is not the steering override during traveling in the second driving assist mode.

7. The driving assist system according to claim 1, wherein
the steering wheel contact position detector is divided into a left hand contact detector and a right hand contact detector,
the left hand contact detector and the right hand contact detect are provided, respectively, in left and right sides across a middle of the steering wheel, and
the contact sensors are provided in each of the left hand contact detector and the right hand contact detector.

8. The driving assist system according to claim 2, wherein
the steering wheel contact position detector is divided into a left hand contact detector and a right hand contact detector,
the left hand contact detector and the right hand contact detect are provided, respectively, in left and right sides across a middle of the steering wheel, and
the contact sensors are provided in each of the left hand contact detector and the right hand contact detector.

9. The driving assist system according to claim 3, wherein
the steering wheel contact position detector is divided into a left hand contact detector and a right hand contact detector,
the left hand contact detector and the right hand contact detect are provided, respectively, in left and right sides across a middle of the steering wheel, and
the contact sensors are provided in each of the left hand contact detector and the right hand contact detector.

10. The driving assist system according to claim 4, wherein
the steering wheel contact position detector is divided into a left hand contact detector and a right hand contact detector,
the left hand contact detector and the right hand contact detect are provided, respectively, in left and right sides across a middle of the steering wheel, and
the contact sensors are provided in each of the left hand contact detector and the right hand contact detector.

11. The driving assist system according to claim 5, wherein
the steering wheel contact position detector is divided into a left hand contact detector and a right hand contact detector,
the left hand contact detector and the right hand contact detect are provided, respectively, in left and right sides across a middle of the steering wheel, and
the contact sensors are provided in each of the left hand contact detector and the right hand contact detector.

12. The driving assist system according to claim 6, wherein
the steering wheel contact position detector is divided into a left hand contact detector and a right hand contact detector,
the left hand contact detector and the right hand contact detect are provided, respectively, in left and right sides across a middle of the steering wheel, and
the contact sensors are provided in each of the left hand contact detector and the right hand contact detector.

13. A driving assist system, comprising:
a contact position detector including a plurality of contact sensors, the contact sensors including a first contact sensor disposed in a a driver side segment, a second contact sensor disposed in an inner peripheral side segment, a third contact sensor disposed in an outer peripheral side segment, and a fourth contact sensor disposed in a windshield side segment of a holding part provided on a steering wheel, the contact position detector being configured to detect a position on the steering wheel at which a driver makes a contact with the steering wheel;
a torque detector configured to detect a steering torque of the driver; and
circuitry configured to
set a driving mode of an own vehicle on a basis of a driving condition, the driving mode including a first driving assist mode, a second driving assist mode, and a manual driving mode, the first driving assist mode allowing for automatic driving that is based on a condition that the driver holds the steering wheel, the second driving assist mode allowing for the automatic driving that is not based on the condition that the driver holds the steering wheel, the manual driving mode allowing the driver himself/herself to steer the steering wheel, and
determine whether the steering torque detected by the torque detector is a steering override intended by the driver or a false detection, on a basis of the steering torque detected by the torque detector and a position at which the contact is detected by the plurality of contact sensors wherein when 1) the steering torque detected by the torque detector exceeds a steering override determining threshold set to a predetermined value and 2) one of the first contact sensor in the driver side segment and the second contact sensor in the inner peripheral side segment has detected the contact, the circuitry determines that the steering torque detected by the steering torque is the false detection, and wherein when 1) the steering torque detected by the torque detector exceeds the steering override determining threshold and 2) one of the third contact sensor in the outer peripheral side segment and the fourth contact sensor in the windshield side segment has detected the contact, the circuitry determines that the steering torque detected by the torque detector is the steering override.

\* \* \* \* \*